(12) United States Patent
Horiyama

(10) Patent No.: US 12,466,351 B2
(45) Date of Patent: Nov. 11, 2025

(54) COVER DEVICE FOR VEHICLE

(71) Applicant: MORIROKU TECHNOLOGY COMPANY, LTD., Tokyo (JP)

(72) Inventor: Jungo Horiyama, Tokyo (JP)

(73) Assignee: MORIROKU CO., LTD., Tokyo (JP)

(*) Notice: Subject to any disclaimer, the term of this patent is extended or adjusted under 35 U.S.C. 154(b) by 428 days.

(21) Appl. No.: 18/313,554

(22) Filed: May 8, 2023

(65) Prior Publication Data
US 2023/0382331 A1     Nov. 30, 2023

(30) Foreign Application Priority Data
May 24, 2022   (JP) .................................. 2022-084189

(51) Int. Cl.
| B60R 19/02 | (2006.01) |
| B60R 13/04 | (2006.01) |
| B60R 19/52 | (2006.01) |

(52) U.S. Cl.
CPC ............ B60R 19/023 (2013.01); B60R 13/04 (2013.01); B60R 19/52 (2013.01)

(58) Field of Classification Search
CPC ....... B60R 19/023; B60R 13/04; B60R 19/52; B60R 13/005
See application file for complete search history.

(56) References Cited

U.S. PATENT DOCUMENTS

2011/0304168 A1*  12/2011  Muller .................. B60R 19/023
                                                          296/1.08
2013/0107046 A1*  5/2013  Forgue .................... B60R 19/52
                                                          348/148

FOREIGN PATENT DOCUMENTS

| JP | 2016-124113 A | 7/2016 | |
| JP | 2019-177873 A | 10/2019 | |
| JP | 2020-044904 A | 3/2020 | |
| WO | WO-2019130033 A1 * | 7/2019 | ............. B60R 19/52 |

OTHER PUBLICATIONS

DE 102012015843 A1 (Year: 2012).*
DE 112010002578 T5 (Year: 2013).*
CN 104228733 A (Year: 2014).*
WO 2018105644 A1 (Year: 2018).*

* cited by examiner

*Primary Examiner* — Lori Lyjak
(74) *Attorney, Agent, or Firm* — Rankin, Hill & Clark LLP

(57) ABSTRACT

A first cover body of a cover device for vehicle includes a transparent member and a support member integrally formed on a back surface of the transparent member. The support member includes a first extension portion extending from an edge of the support member to a side opposite the transparent member. The transparent member includes a second extension portion and a decoration layer. The second extension portion is integrally formed with the first extension portion. The decoration layer overlaps an entirety of the second extension portion when viewed from a front surface of the transparent member, and is opaque over an entire surface.

9 Claims, 6 Drawing Sheets

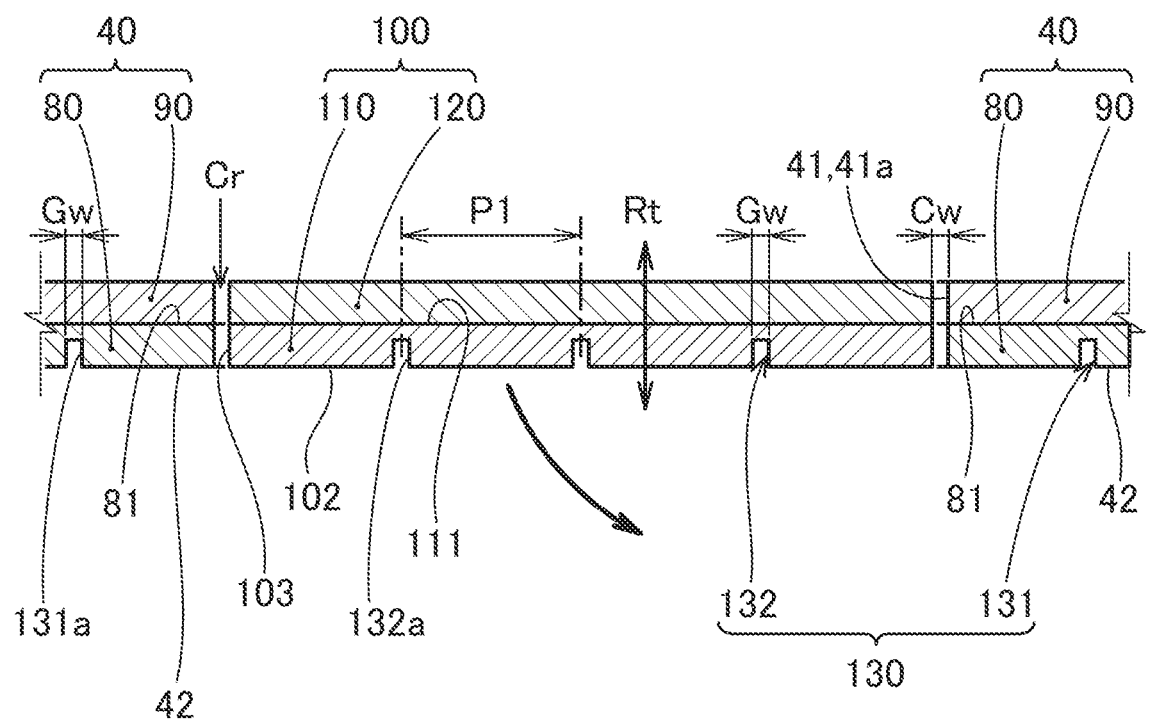
FIG.5
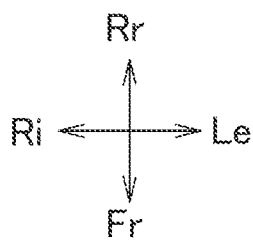

COVER DEVICE FOR VEHICLE

FIELD OF THE INVENTION

The present invention relates to an improved technique for a cover device for vehicle.

BACKGROUND

Many vehicles such as passenger vehicles are provided with various cover devices for vehicle. The cover device for vehicle covers an exterior or an interior of a vehicle body. A configuration including a cover body such as a front bumper cover can be provided as one example of the cover device for vehicle. As techniques relating to the cover device for vehicle in the related art, there are techniques disclosed in Japanese Unexamined Patent Publication No. 2019-177873 (refer to FIG. 1 and FIG. 2) and Japanese Unexamined Patent Publication No. 2020-044904 (refer to FIG. 1 and FIG. 2).

A cover device for vehicle illustrated in Japanese Unexamined Patent Publication No. 2019-177873 includes a radar cover (cover body) covering a radar unit mounted in a front portion of a vehicle. The radar cover includes a transparent member made of a transparent resin material, and a support member of black color integrally formed on a back surface of the transparent member and supporting the transparent member. The support member includes an engaging portion protruding to an engine compartment side. The engaging portion extends from an edge of the support member to a side opposite the transparent member, and engages with a radiator grille body or the like.

A cover device for vehicle illustrated in Japanese Unexamined Patent Publication No. 2020-044904 has a configuration in which a hook opening formed in a front grille body portion is closed by a hook cover. A design portion of a diagonal lattice pattern protruding forward is provided on each of a front surface of the front grille body portion and a front surface of the hook cover. In a state where the hook opening is closed by the hook cover, a portion of the design portion of the front grille body portion is covered by a peripheral edge of the design portion of the hook cover from the front of a vehicle, the portion being located at an edge of the hook opening. As a result, the design of the hook cover is absorbed into the design of the front grille body portion, and appears as one component.

SUMMARY

In the cover device for vehicle illustrated in Japanese Unexamined Patent Publication No. 2019-177873, when the radar cover (cover body) is viewed from the front of the vehicle, there is a possibility that a peripheral edge or the engaging portion of the support member can be visually observed through a gap present at a peripheral edge of the support member. In order to enhance the external appearance of the cover device for vehicle, it can be considered that an extension portion is provided to extend rearward from the back surface of the transparent member and to cover an area around the peripheral edge of the support member or the engaging portion. However, the thickness of the transparent member differs between a central portion and a peripheral edge portion. There is room for further improvement to further enhance the external appearance of the cover device for vehicle.

In the cover device for vehicle illustrated in Japanese Unexamined Patent Publication No. 2020-044904, the towing hook cover (cover body) is not a composite material of a transparent member and a support member.

An object of the present disclosure is to provide a cover device for vehicle that can further enhance the external appearance.

According to the present disclosure, there is provided a cover device for vehicle including a first cover body including a transparent member and a support member integrally formed on a back surface of the transparent member and supporting the transparent member. The support member includes a first extension portion extending from an edge of the support member to a side opposite the transparent member. The transparent member includes a second extension portion integrally formed with the first extension portion, and a decoration layer that overlaps an entirety of the second extension portion when the first cover body is viewed from a front surface of the transparent member, and that is opaque over an entire surface.

Preferably, the support member includes a terminal portion protruding from a distal end portion of the first extension portion along the support member and in a direction away from the support member, and the second extension portion extends rearward from the back surface of the transparent member to the terminal portion along the first extension portion.

Preferably, the transparent member has a decorated surface having a convex shape and protruding from the front surface of the transparent member to a side opposite the second extension portion, and the decoration layer is provided on the decorated surface in the transparent member.

Preferably, the cover device for vehicle further includes a second cover body adjacent to and along a front surface of the first cover body, the second cover body includes a lid opening portion that is openable and closable by a lid, a front surface of the lid matches a front surface of the second cover body in a front-back direction of the second cover body, a first groove having a recessed shape is formed in the front surface of the second cover body, and when the second cover body is viewed from the front surface of the second cover body, a clearance gap between an edge of the lid opening portion and an edge of the lid matches a width of the first groove.

Preferably, a second groove having a recessed shape is formed in the front surface of the lid, and the second groove is disposed at a position continuous with the first groove of the second cover body.

According to the present disclosure, it is possible to further enhance the external appearance of the cover device for vehicle.

BRIEF DESCRIPTION OF THE DRAWINGS

FIG. 5 is a cross-sectional view taken along line 5-5 in FIG. 2; and

DETAILED DESCRIPTION OF THE PREFERRED EMBODIMENTS

Figure 1:
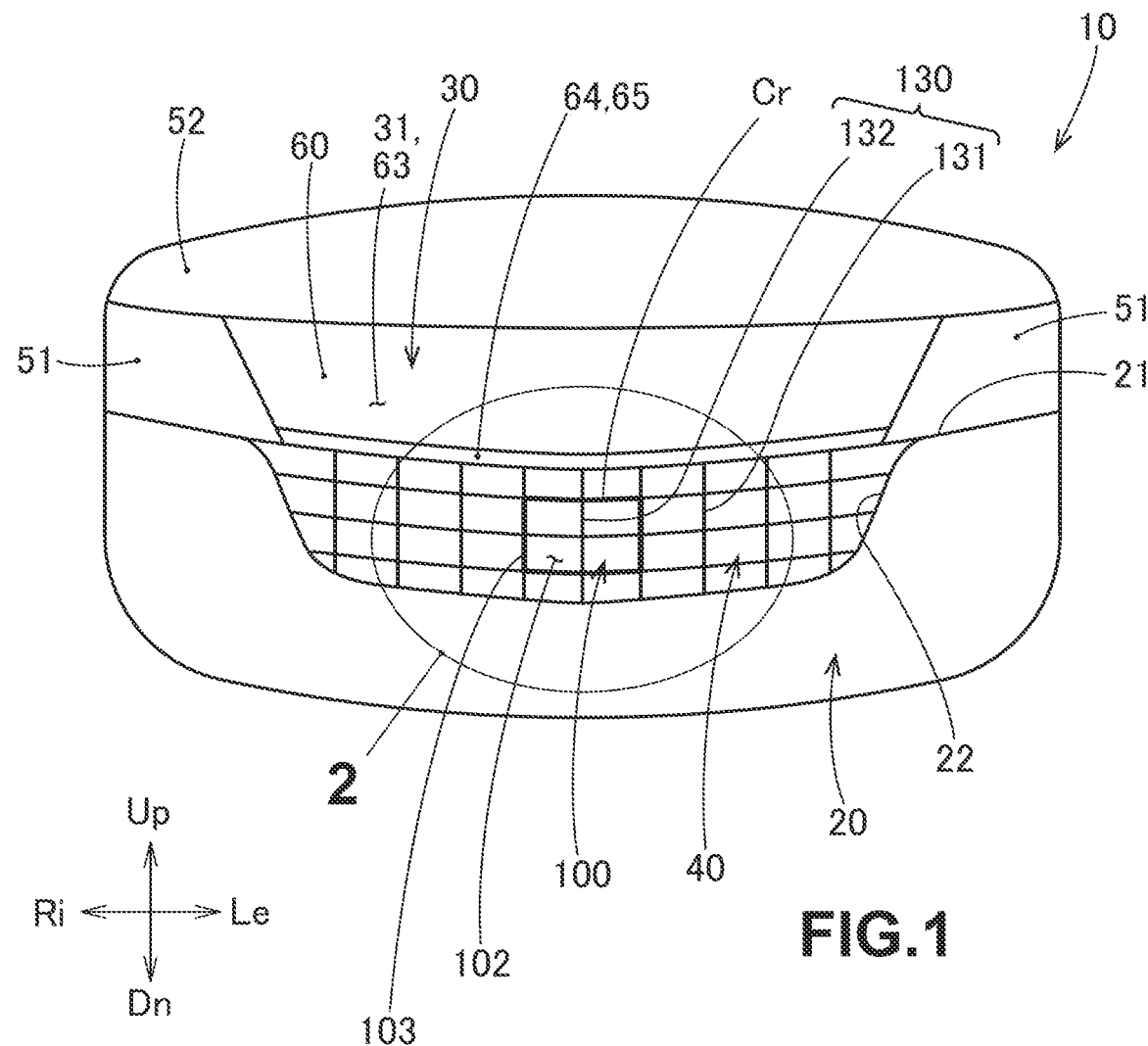
FIG. 1 is a view of a cover device for vehicle according to an embodiment when viewed from the front of a vehicle.

An embodiment of the invention will be described below with reference to the accompanying drawings. Incidentally, the forms illustrated in the accompanying drawings are one example of the invention, and the invention is not limited to the forms. In the description, left-right indicates left-right with reference to an occupant of a vehicle, and front-rear indicates front-rear with reference to a traveling direction of the vehicle. In addition, in the drawings, Fr represents the front, Rr represents the rear, Le represents the left when viewed from the occupant, Ri represents the right when viewed from the occupant, Up represents the top or up, and Dn represents the bottom or down.

EMBODIMENT

An embodiment will be described with reference to the drawings.

As illustrated in FIG. 1, a cover device for vehicle 10 covers an exterior of a vehicle body (not illustrated) in a vehicle such as a passenger vehicle. As one example of the cover device for vehicle 10, a configuration that covers a front portion of the vehicle body will be described. However, the cover device for vehicle 10 is not limited to the configuration that covers the front portion of the vehicle body, and can also be applied to, for example, a configuration that covers an entire exterior of the vehicle body or an interior (including a passenger compartment) of the vehicle body.

Figure 2:
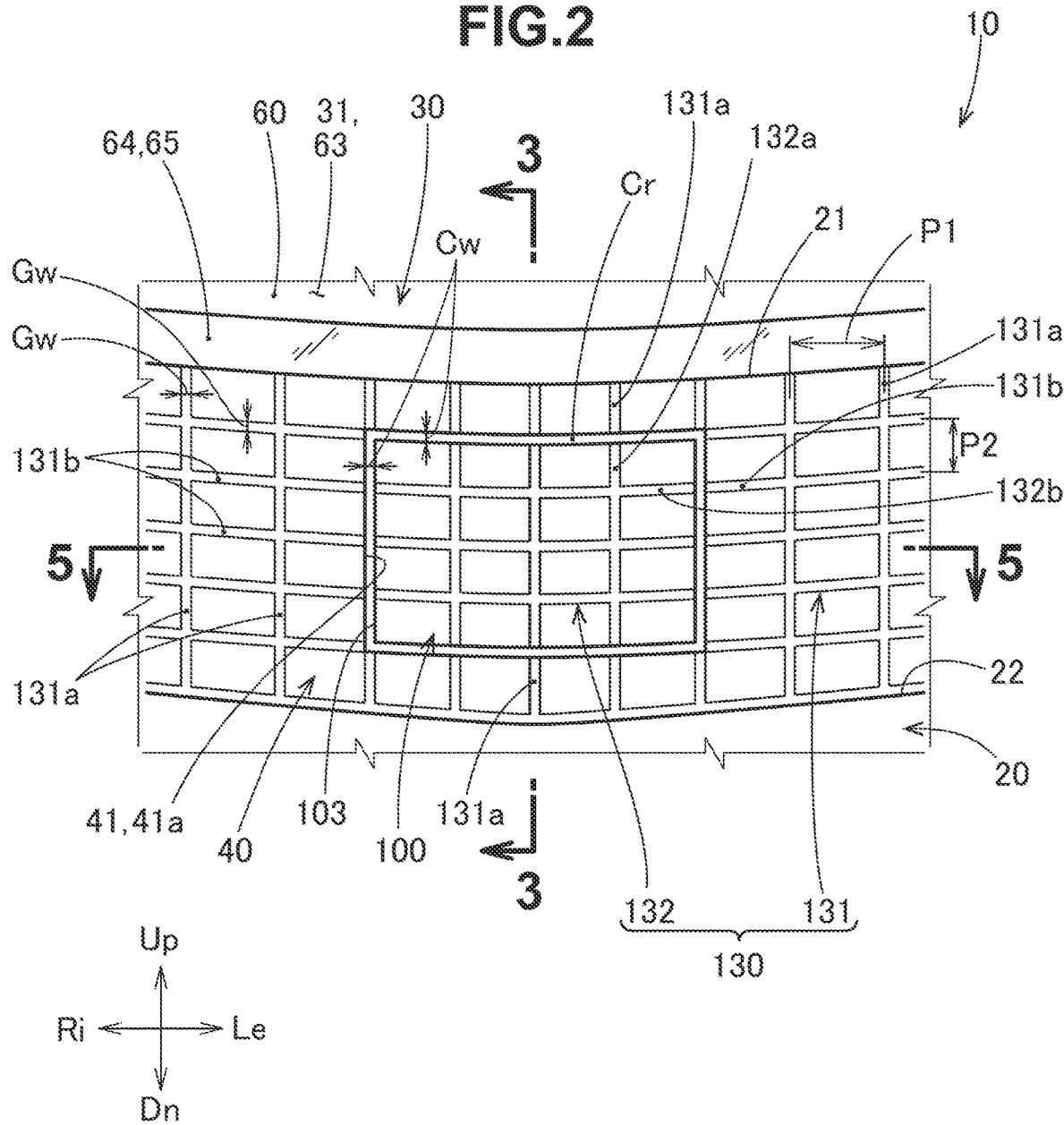
FIG. 2 is an enlarged view of a part 2 in FIG. 1.

As illustrated in FIG. 1 and FIG. 2, the cover device for vehicle 10 includes a front bumper cover 20 that covers a front surface of a front bumper (not illustrated); a first cover body 30 adjacent to an upper edge 21 (upper end 21) of the front bumper cover 20; and a second cover body 40 assembled to an opening portion 22 of the front bumper cover 20.

The opening portion 22 has a recessed configuration that opens an upper side of the front bumper cover 20 when viewed from the front of the vehicle, and an upper end of the opening portion 22 is closed by the first cover body 30. The first cover body 30 is a slender strip-shaped member extending in a vehicle width direction along the upper edge 21 of the front bumper cover 20. Left and right headlamps 51 and 51 are disposed on an upper portion of the front bumper cover 20. A hood 52 is disposed above the first cover body 30.

Figure 3:
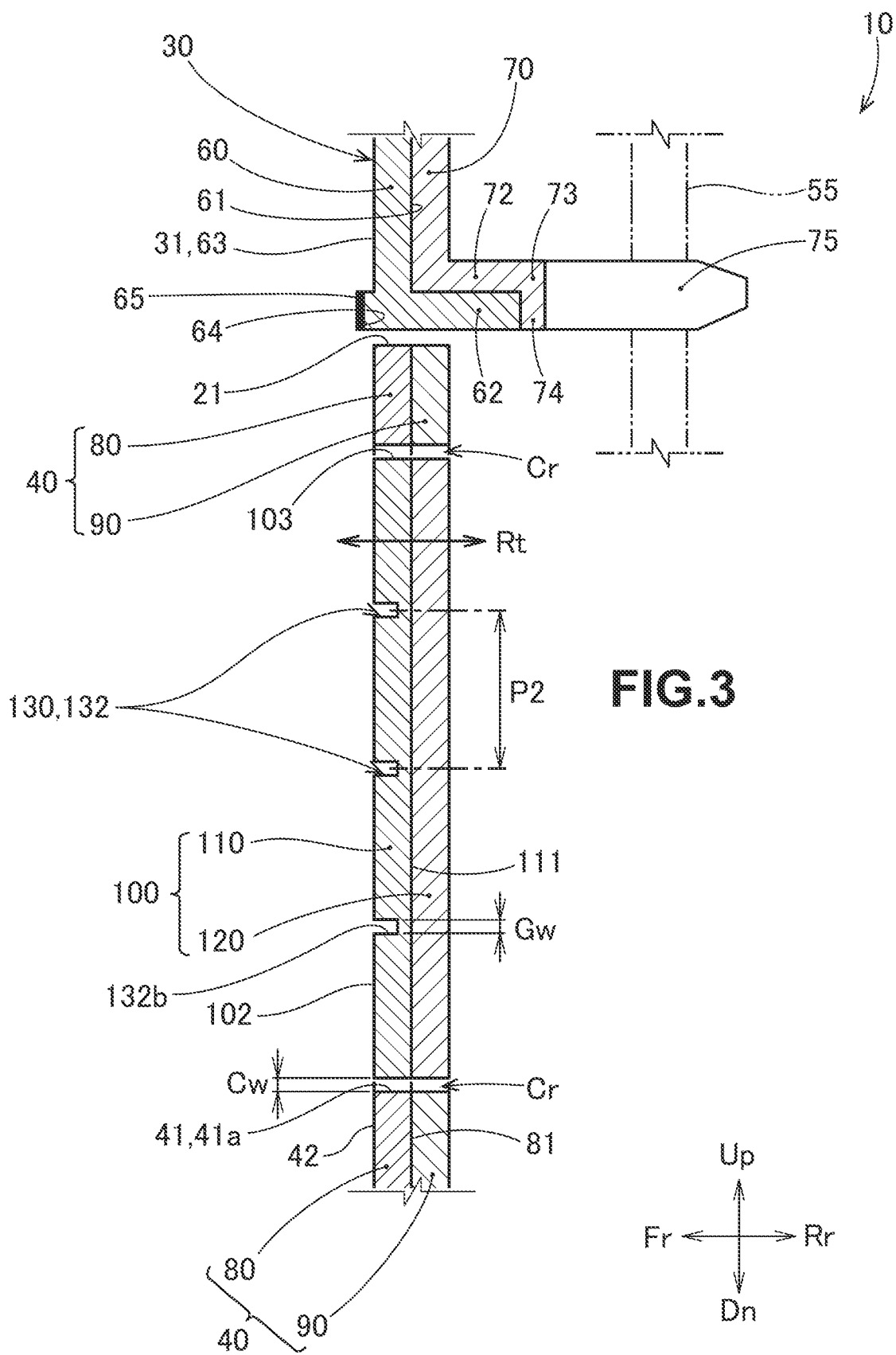
FIG. 3 is a cross-sectional view taken along line 3-3 in FIG. 2.
Figure 4:
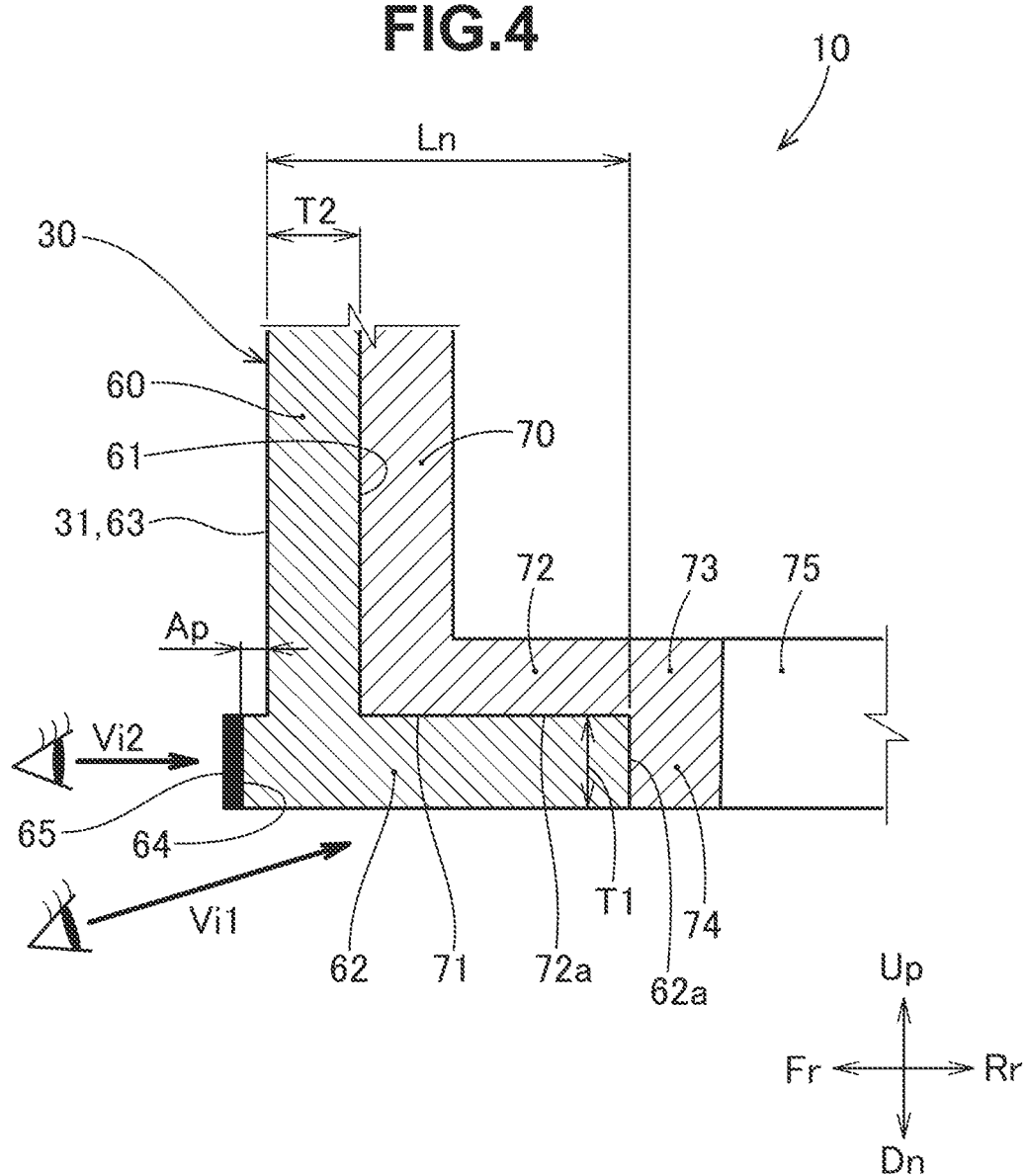
FIG. 4 is an enlarged view around a first extension portion of a support member and a second extension portion and a decorated surface of a transparent member illustrated in FIG. 3.

The first cover body 30 may be reworded as the "cover body 30" as appropriate. As illustrated in FIG. 3 and FIG. 4, the first cover body 30 includes a transparent member 60 having a vertical plate shape and located on a vehicle front side, and a support member 70 having a vertical plate shape and integrally formed with a back surface 61 of the transparent member 60. The transparent member 60 is a molded article made of transparent resin, and is molded from, for example, acrylic resin or polycarbonate resin. The support member 70 is a molded article made of colored resin (for example, opaque resin of black color or the like) and supporting the transparent member 60, and is molded from, for example, ABS resin or polypropylene resin.

First, the support member 70 will be described. As illustrated in FIG. 4, the support member 70 includes a first extension portion 72 integrally formed on an edge 71 (lower edge 71) of the support member 70, and a terminal portion 74 integrally formed at a distal end portion 73 of the first extension portion 72. Here, the edge 71 of the support member 70 corresponds to an edge of the support member 70, which is adjacent to the upper edge 21 of the front bumper cover 20 illustrated in FIG. 1. The first extension portion 72 and the terminal portion 74 are composed of a molded article made of the same resin as the support member 70.

The first extension portion 72 is a horizontal plate-shaped member extending from the edge 71 of the support member 70 to a side opposite the transparent member 60.

The terminal portion 74 is a vertical plate-shaped member protruding from the distal end portion 73 of the first extension portion 72 along the support member 70 and in a direction away from the support member 70. A protrusion amount of the terminal portion 74 corresponds to a plate thickness T1 of a second extension portion 62 to be described later.

A latching portion 75 having a bar shape and extending to the side opposite the transparent member 60 may be integrally formed at the distal end portion 73 of the first extension portion 72. The latching portion 75 is latched to a latched portion 55 (refer to FIG. 3) provided in a vehicle body-side fixing member, through press-fitting, latching, and screwing. As a result, the first cover body 30 can be attached to the vehicle body-side fixing member.

The transparent member 60 includes the second extension portion 62 integrally formed on the back surface 61 of the transparent member 60, and a decorated surface 64 integrally formed on a front surface 63 of the transparent member 60. Here, the front surface 63 of the transparent member 60 corresponds to a surface viewed from the front of the vehicle. The second extension portion 62 and the decorated surface 64 are composed of a molded article made of the same transparent resin as the transparent member 60.

The second extension portion 62 is a horizontal plate-shaped member extending rearward from the back surface 61 of the transparent member 60 to the terminal portion 74 along a lower surface 72a of the first extension portion 72. In other words, the second extension portion 62 extends rearward from the back surface 61 of the transparent member 60 to the terminal portion 74 along the first extension portion 72, and is integrally formed with the first extension portion 72. For example, the plate thickness T1 of the second extension portion 62 is the same as a plate thickness T2 of the transparent member 60. A length from the front surface 63 of the transparent member 60 to a distal end surface 62a of the second extension portion 62 is Ln.

The decorated surface 64 is a flat convex portion protruding from the front surface 63 of the transparent member 60 to a side opposite the second extension portion 62. A protrusion amount from the front surface 63 of the transparent member 60 to the decorated surface 64, namely, the height of a step of the decorated surface 64 with respect to the front surface 63 is Ap.

The decorated surface 64 includes a decoration layer 65 that overlaps the entirety of the second extension portion 62 when the first cover body 30 is viewed from the front surface 63 (when viewed from the front of the vehicle), and that is opaque over the entire surface (including substantially the entire surface).

It is preferable that the decoration layer 65 is composed of, for example, a thin film layer formed by hot stamping, namely, a hot stamping layer formed by a hot stamping method using a metal foil. Since decorative bordering with metallic luster can be obtained by providing a thin film layer on the decorated surface 64 using hot stamping, the design aesthetics of the first cover body 30 can be enhanced.

The above description of the first cover body 30 is summarized as follows.

As illustrated in FIG. 4, the cover device for vehicle 10 includes the first cover body 30 including the transparent member 60 and the support member 70 integrally formed on the back surface 61 of the transparent member 60 and supporting the transparent member 60. The support member 70 includes the first extension portion 72 extending from the edge 71 of the support member 70 to the side opposite the transparent member 60. The transparent member 60 includes the second extension portion 62 integrally formed with the first extension portion 72, and the decoration layer that overlaps the entirety of the second extension portion 62 when the first cover body 30 is viewed from the front surface 63, and that is opaque over the entire surface (including substantially the entire surface).

Generally, when the first cover body 30 is viewed from the front of the cover device for vehicle 10, there is a possibility that a back side of the first cover body 30 can be visually observed through a gap present at a peripheral edge of the first cover body (refer to a line of sight Vi1 in FIG. 4).

On the other hand, in the present embodiment, as described above, the second extension portion 62 of the transparent member 60 is integrally formed with the first extension portion 72. For this reason, the first cover body 30 can maintain the same external appearance as when visually observed from the front.

By the way, the length Ln from the front surface 63 of the transparent member to the distal end surface 62a of the second extension portion 62 is larger than the plate thickness T2 of the transparent member 60 (Ln>T2). For this reason, in a case where the transparent member 60 does not include the decorated surface 64 and the decoration layer 65, when the first cover body 30 is directly viewed from the front, it can be considered that the appearance (sense of depth) when looking through only the transparent member 60 is different from the appearance (sense of depth) when looking through the second extension portion 62.

On the other hand, as described above, the transparent member 60 includes the decoration layer 65 that overlaps the entirety of the second extension portion 62 when the first cover body 30 is viewed from the front surface 63, and that is opaque over the entire surface (including substantially the entire surface).

For this reason, when the first cover body 30 is viewed from the front of the cover device for vehicle 10, the second extension portion 62 is hidden by the decoration layer 65 that is opaque, so that the second extension portion 62 cannot be visually observed through (refer to a line of sight Vi2 in FIG. 4). Instead, the decoration layer can be visually observed. The design aesthetics of the entirety of the first cover body 30 can be enhanced by providing the decoration layer 65. As a result, it is possible to provide the cover device for vehicle 10 that can enhance the external appearance. Incidentally, if the second extension portion 62 is hidden, the range of the decoration layer 65 can be set to an optimal value. Namely, when the first cover body is viewed from the front of the cover device for vehicle 10, the range of the decoration layer 65 with respect to a front surface 31 of the first cover body 30 is set such that the second extension portion 62 is hidden by the decoration layer 65. The range of the decorated surface 64 is set to match the range of the decoration layer 65.

In this way, in the present embodiment, when the first cover body 30 is viewed from the front of the cover device for vehicle 10, the visual observation of the back side of the first cover body 30 through the gap present at the peripheral edge of the first cover body 30 can be restricted, and the external appearance and the design aesthetics of the first cover body 30 can be enhanced by the decoration layer 65 that is opaque.

The support member 70 includes the terminal portion 74 protruding from the distal end portion 73 of the first extension portion 72 along the support member 70 and in the direction away from the support member 70. The second extension portion 62 extends rearward from the back surface 61 of the transparent member 60 to the terminal portion 74 along the first extension portion 72.

The distal end surface 62a of the second extension portion 62 is hidden by the terminal portion 74 that is colored (for example, black color). By arbitrarily setting the length Ln from the front surface 63 of the transparent member 60 to the distal end surface 62a of the second extension portion 62, the visual observation restriction range can be freely set to be optimal.

Further, the transparent member 60 has the decorated surface 64 having a convex shape and protruding from the front surface 63 of the transparent member 60 to the side opposite the second extension portion 62. The decoration layer 65 is provided on the decorated surface 64 in the transparent member 60.

The decorated surface 64 is a stepped surface raised with respect to the front surface 63 of the transparent member 60. For this reason, the decoration layer 65 appears, so to speak, three-dimensional due to the fact that the decoration layer 65 is raised above the front surface 63 of the transparent member 60. Namely, the transparent member 60 can not only restrict visual observation of the back side of the first cover body 30 but also play a role in improving the design aesthetics of the entirety of the first cover body 30. The height Ap of the step may be set to an optimal value in consideration of the improvement of visibility and the improvement of design aesthetics.

Next, the second cover body 40 will be described.

As illustrated in FIG. 1, the second cover body 40 is generally known as a front grille, and is adjacent to and along the front surface 31 (outer surface 31) of the first cover body 30. The second cover body 40 may be reworded as the "cover body 40" or the "front grille 40" as appropriate.

As illustrated in FIG. 3 and FIG. 5, the second cover body 40 (cover body 40) includes, for example, a transparent member 80 having a vertical plate shape and located on the vehicle front side, and a support member 90 having a vertical plate shape and integrally formed on a back surface 81 of the transparent member 80. The transparent member 80 is a molded article made of transparent resin, and is molded from, for example, acrylic resin or polycarbonate resin. The support member 90 is a molded article made of colored resin (for example, opaque resin of black color or the like) and supporting the transparent member 80, and is molded from, for example, ABS resin or polypropylene resin.

Figure 6:
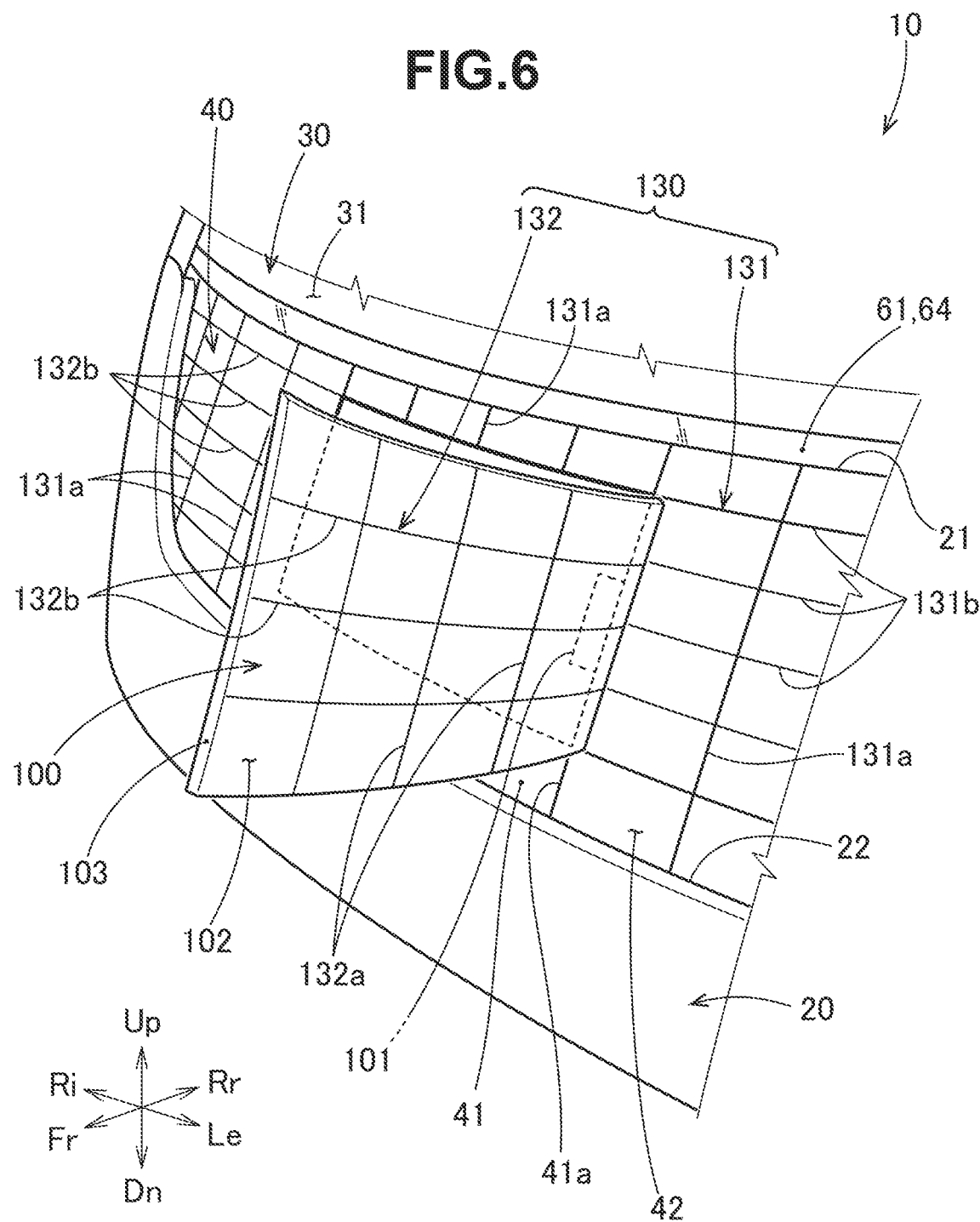
FIG. 6 is a view describing a state where a lid illustrated in FIG. 2 is opened.

Referring also to FIG. 2 and FIG. 6, the second cover body 40 includes a lid opening portion 41 that is openable and closable by a lid 100. The lid opening portion 41 is a hole penetrating through the second cover body 40 in a front-back direction Rt (thickness direction Rt). For example, the lid 100 is swingably supported by a hinge 101 (refer to FIG. 6) to open to one side in a horizonal direction. For example, a battery charging unit or a towing hook disposed on a vehicle body side can be used by opening the lid 100. Since the lid 100 is provided in a part of the front grille 40 (second cover body 40), the lid 100 can be referred to as a front grille garnish. Incidentally, the lid 100 is not limited to an opening and closing structure using the hinge 101, and it is acceptable if the lid 100 is openable and closable with respect to the lid opening portion 41. Further, the lid 100 can be latched to the second cover body 40 by a latching mechanism (not illustrated).

To describe in detail, as illustrated in FIG. 3 and FIG. 5, the lid 100 includes a transparent member 110 having a vertical plate shape and located on the vehicle front side, and a support member 120 having a vertical plate shape and integrally formed on a back surface 111 of the transparent member 110. The transparent member 110 is a molded article made of transparent resin, and is molded from, for example, acrylic resin or polycarbonate resin. The support member 120 is a molded article made of colored resin (for example, opaque resin of black color or the like) and supporting the transparent member 110, and is molded from, for example, ABS resin or polypropylene resin.

A front surface 102 (front-facing surface 102) of the lid 100 matches (is flush with) a front surface 42 (front-facing surface 42) of the second cover body 40 in the front-back direction Rt of the second cover body 40.

The lid 100 in a state where the lid opening portion 41 is closed forms a part of the second cover body 40. For this reason, the second cover body 40 and the lid 100 can be visually recognized with a sense of unity as a whole.

As illustrated in FIG. 2 and FIG. 6, grooves 130 of a continuous lattice pattern (grid pattern) for enhancing design aesthetics are formed in the front surface 42 of the second cover body 40 and in the front surface 102 of the lid 100. Here, the lattice pattern includes a diagonal lattice pattern.

To describe in detail, the grooves 130 of a lattice pattern are composed of first grooves 131 of a lattice pattern formed in the front surface 42 of the second cover body and second grooves 132 of a lattice pattern formed in the front surface 102 of the lid 100. The second grooves 132 of a lattice pattern are continuous with the first grooves 131 of a lattice pattern. Namely, a vertical groove portion 131a of each first groove 131 and a vertical groove portion 132a of each second groove 132 are located to be continuous with each other. A horizontal groove portion 131b of each first groove 131 and a horizontal groove portion 132b of each second groove 132 are located to be continuous with each other.

Referring also to FIG. 3 and FIG. 5, the pitch between the vertical groove portions 131a (between the vertical groove portions 132a) is P1. The pitch between the horizontal groove portions 131b (between the horizontal groove portions 132b) is P2. The pitches P1 and P2 are collectively referred to as "groove pitches P1 and P2".

As illustrated in FIG. 3 and FIG. 5, it is preferable that the first grooves 131 are formed only in the transparent member 80 of the second cover body 40. It is preferable that the second grooves 132 are formed only in the transparent member 110 of the lid 100. The groove pitch, the groove width, and the groove depth of the first grooves 131 and the second grooves 132 are optional, and are set to optimize design aesthetics when the second cover body 40 and the lid 100 are viewed from the front of the cover device for vehicle 10.

As illustrated in FIG. 2 and FIG. 6, when the second cover body 40 is viewed from the front surface 42, the shapes and the orientations of the lid opening portion 41 and the lid 100 match the shape of the grooves 130 of a lattice pattern. For example, in a case where the grooves 130 are configured in a diagonal lattice pattern, the shapes and the orientations of the lid opening portion 41 and the lid 100 match the shape of the diagonal lattice pattern.

As illustrated in FIG. 2, when the second cover body 40 is viewed from the front surface 42 of the second cover body 40, a clearance gap Cr between an edge 41a of the lid opening portion 41 and an edge 103 of the lid 100 matches (including substantial matching) the grooves 130 of a lattice pattern. When the second cover body 40 is viewed from the front surface 42, the size of the lid 100 is a multiple of the groove pitches P1 and P2. A width Cw of the gap Cr is the same as a groove width Gw of the first grooves 131 and the second grooves 132.

Configurations of the first grooves 131 and the second grooves 132 described above can be described as follows (refer to FIG. 2, FIG. 3, and FIG. 5). The first grooves 131 having a recessed shape are formed in the front surface 42 of the second cover body 40. When the second cover body 40 is viewed from the front surface 42 of the second cover body 40, the clearance gap Cr between the edge 41a of the lid opening portion 41 and the edge 103 of the lid 100 matches (including substantial matching) the width Gw (groove width Gw) of the first grooves 131. The second grooves 132 having a recessed shape are formed in the front surface 102 of the lid 100. As illustrated in FIG. 2, the second grooves 132 are disposed at positions continuous with the first grooves 131 of the second cover body 40.

The above description of the second cover body 40 is summarized as follows.

As illustrated in FIG. 2, the lid 100 in a state where the lid opening portion 41 is closed forms a part of the second cover body 40. The clearance gap Cr is inevitably generated between the edge 41a of the lid opening portion 41 and the edge 103 of the lid 100. It is preferable that when the second cover body 40 is viewed from the front surface 42, the gap Cr is unnoticeable.

As a technique for making the gap Cr unnoticeable in the related art, there is the cover device for vehicle illustrated in Japanese Unexamined Patent Publication No. 2020-044904. However, in Japanese Unexamined Patent Publication No. 2020-044904, the design portion of a diagonal lattice pattern protruding forward is provided on each of the front surface of the front grille body portion and the front surface of the hook cover. In a state where the hook opening is closed by the hook cover, the portion of the design portion of the front grille body portion is covered by the peripheral edge of the design portion of the hook cover from the front of the vehicle, the portion being located at the edge of the hook opening. However, in such a technique of the related art, the configuration is complicated and the manufacturing cost is high.

On the other hand, the second cover body 40 of the present embodiment includes the lid opening portion 41 that is openable and closable by the lid 100. The front surface 102 of the lid 100 matches (including substantially matching) the front surface 42 of the second cover body 40 in the front-back direction Rt (refer to FIG. 5) of the second cover body 40. The grooves 130 of a continuous lattice pattern are formed in the front surface 42 of the second cover body 40 and in the front surface 102 of the lid 100. When the second cover body 40 is viewed from the front surface 42 of the second cover body 40, the clearance gap Cr between the edge 41a of the lid opening portion 41 and the edge 103 of the lid 100 matches (including substantial matching) the grooves 130 of a lattice pattern.

Namely, the grooves 130 of a continuous lattice pattern for enhancing design aesthetics are formed in the front surface 42 of the second cover body 40 and in the front surface 102 of the lid 100. Moreover, when the second cover body 40 is viewed from the front surface 42, the gap Cr matches the grooves 130 of a lattice pattern. The grooves 130 are recessed with respect to the front surface 42 of the second cover body 40. Since it is difficult to distinguish a portion of the gap Cr from the grooves 130, the portion of the gap Cr can only be seen as a part of the grooves 130. The position of the portion of the gap Cr is unnoticeable with respect to the grooves 130. For this reason, the second cover body 40 and the lid 100 can be visually recognized as one cohesive design (having a sense of unity as a whole).

In this way, by configuring the grooves 130 provided in the front surface 42 of the second cover body 40 and in the front surface 102 of the lid 100, in the form of a continuous lattice pattern, the clearance gap Cr appears as one cohesive design with respect to the grooves 130 of a lattice pattern (appears assimilated). Moreover, the gap Cr can be made unnoticeable with a very simple configuration in which only the grooves 130 provided in the front surface 42 of the second cover body 40 and in the front surface 102 of the lid 100 are configured in the form of a continuous lattice pattern.

The second cover body 40 of the present embodiment can also be summarized as follows.

The first grooves 131 having a recessed shape are formed in the front surface 42 of the second cover body 40. When the second cover body 40 is viewed from the front surface 42 of the second cover body 40, the clearance gap Cr between the edge 41*a* of the lid opening portion 41 and the edge 103 of the lid 100 matches (including substantial matching) the width Gw of the first grooves 131. Here, the first grooves 131 and the second grooves 132 are not limited to the configuration of grooves of a lattice pattern.

Namely, the first grooves 131 having a recessed shape for enhancing design aesthetics are formed in the front surface 42 of the second cover body 40. Moreover, when the second cover body 40 is viewed from the front surface 42, the gap Cr matches the first grooves 131. The first grooves 131 are recessed with respect to the front surface 42 of the second cover body 40. Since it is difficult to distinguish the portion of the gap Cr from the first grooves 131, the portion of the gap Cr can only be seen as a part of the first grooves 131. The position of the portion of the gap Cr is unnoticeable with respect to the first grooves 131. For this reason, the second cover body 40 and the lid 100 can be visually recognized as one cohesive design (having a sense of unity as a whole).

In this way, the clearance gap Cr appears as one cohesive design with respect to the first grooves 131 provided in the front surface 42 of the second cover body 40 (appears assimilated). Moreover, the gap Cr can be made unnoticeable with a very simple configuration in which only the first grooves 131 are provided in the front surface 42 of the second cover body 40.

Further, the second grooves 132 having a recessed shape are formed in the front surface 102 of the lid 100. The second grooves 132 are disposed at positions continuous with the first grooves 131 of the second cover body 40.

Namely, the second grooves 132 having a recessed shape for enhancing design aesthetics are formed in the front surface 102 of the lid 100. Moreover, when the second cover body 40 is viewed from the front surface 42, the gap Cr matches the second grooves 132. The second grooves 132 are recessed with respect to the front surface 102 of the lid 100. Since it is difficult to distinguish the portion of the gap Cr from the first grooves 131 and the second grooves 132 continuous with the first grooves 131, the portion of the gap Cr can only be seen as a part of the first grooves 131 and the second grooves 132. The position of the portion of the gap Cr is unnoticeable with respect to the first grooves 131 and the second grooves 132. For this reason, the second cover body 40 and the lid 100 can be visually recognized as one cohesive design (having a sense of unity as a whole).

As is clear from the above description, by providing the first grooves 131 and the second grooves 132 in the front surface 42 of the second cover body 40 and in the front surface 102 of the lid 100, the clearance gap Cr appears as one cohesive design with respect to the first grooves 131 and the second grooves 132 (appears assimilated). Moreover, the gap Cr can be made unnoticeable with a very simple configuration in which only the first grooves 131 and the second grooves 132 are provided in the front surface 42 of the second cover body 40 and in the front surface 102 of the lid 100.

Incidentally, the invention is not limited to the embodiment as long as the actions and the effects of the invention are achieved.

For example, the cover device for vehicle 10 is not limited to the configuration that covers the front portion of the vehicle body, and may be configured to cover other portions. For example, the cover device for vehicle 10 can also be applied to the configuration that covers the entire exterior of the vehicle body or the interior (including the passenger compartment) of the vehicle body.

In addition, the configuration in which the cover device for vehicle 10 is provided in a passenger vehicle has been provided as an example; however, the cover device for vehicle 10 can also be applied to vehicles other than passenger vehicles, and is not limited to these forms.

In addition, as illustrated in FIG. 5, in the combined structure of the second cover body 40 and the lid 100, one or both of the second cover body 40 and the lid 100 may be made of a single material (not limited to being made of a composite material of a transparent member and a support member).

What is claimed is:

1. A cover device for vehicle comprising:
a first cover body including a transparent member and a support member integrally formed on a back surface of the transparent member and supporting the transparent member,
wherein the support member includes a first extension portion extending from an edge of the support member to a side opposite the transparent member, and
the transparent member includes a second extension portion integrally formed with the first extension portion, and a decoration layer that overlaps an entirety of the second extension portion when the first cover body is viewed from a front surface of the transparent member, and that is opaque over an entire surface.

2. The cover device for vehicle according to claim 1,
wherein the support member includes a terminal portion protruding from a distal end portion of the first extension portion along the support member and in a direction away from the support member, and
the second extension portion extends rearward from the back surface of the transparent member to the terminal portion along the first extension portion.

3. The cover device for vehicle according to claim 1,
wherein the transparent member has a decorated surface having a convex shape and protruding from the front surface of the transparent member to a side opposite the second extension portion, and
the decoration layer is provided on the decorated surface in the transparent member.

4. The cover device for vehicle according to claim 1, further comprising:

a second cover body adjacent to and along a front surface of the first cover body, wherein the second cover body includes a lid opening portion that is openable and closable by a lid, a front surface of the lid matches a front surface of the second cover body in a front-back direction of the second cover body, a first groove having a recessed shape is formed in the front surface of the second cover body, and when the second cover body is viewed from the front surface of the second cover body, a clearance gap between an edge of the lid opening portion and an edge of the lid matches a width of the first groove.

5. The cover device for vehicle according to claim 2, further comprising:

a second cover body adjacent to and along a front surface of the first cover body, wherein the second cover body includes a lid opening portion that is openable and closable by a lid, a front surface of the lid matches a front surface of the second cover body in a front-back direction of the second cover body, a first groove having a recessed shape is formed in the front surface of the second cover body, and when the second cover body is viewed from the front surface of the second cover body, a clearance gap between an edge of the lid opening portion and an edge of the lid matches a width of the first groove.

6. The cover device for vehicle according to claim 3, further comprising:

a second cover body adjacent to and along a front surface of the first cover body, wherein the second cover body includes a lid opening portion that is openable and closable by a lid, a front surface of the lid matches a front surface of the second cover body in a front-back direction of the second cover body, a first groove having a recessed shape is formed in the front surface of the second cover body, and when the second cover body is viewed from the front surface of the second cover body, a clearance gap between an edge of the lid opening portion and an edge of the lid matches a width of the first groove.

7. The cover device for vehicle according to claim 4, wherein a second groove having a recessed shape is formed in the front surface of the lid, and the second groove is disposed at a position continuous with the first groove of the second cover body.

8. The cover device for vehicle according to claim 5, wherein a second groove having a recessed shape is formed in the front surface of the lid, and the second groove is disposed at a position continuous with the first groove of the second cover body.

9. The cover device for vehicle according to claim 6, wherein a second groove having a recessed shape is formed in the front surface of the lid, and the second groove is disposed at a position continuous with the first groove of the second cover body.

* * * * *